H. W. McKNIGHT.
Refrigerator

No. 7,965. Reissued Nov. 27, 1877.

Witnesses
Jos. B. Connolly
D. Cook

Inventor
H. W. McKnight
By Connolly Bros
Attorneys

BEST AVAILABLE COPY

UNITED STATES PATENT OFFICE.

HARVEY W. McKNIGHT, OF EASTON, PENNSYLVANIA.

IMPROVEMENT IN REFRIGERATORS.

Specification forming part of Letters Patent No. 147,957, dated February 24, 1874; Reissue No. 7,965, dated November 27, 1877; application filed July 30, 1877.

*To all whom it may concern:*

Be it known that I, HARVEY W. McKNIGHT, of Easton, in the county of Northampton and State of Pennsylvania, have invented certain new and useful Improvements in Refrigerators; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention has for its object to produce a constant circulation or current of cold air in and through refrigerators and preserving-houses without the employment of a fan or blower.

The nature of my invention consists in the peculiar arrangement, construction, and combination of parts, as hereinafter fully described, having reference particularly to the provision and arrangement of air induction and eduction pipes or passages, the former being packed in or passing through ice or other refrigerant, and discharging their contents into the preserving-chamber through or near the top of said chamber, and the latter having communication with said chamber at or near its floor.

Figure 1:
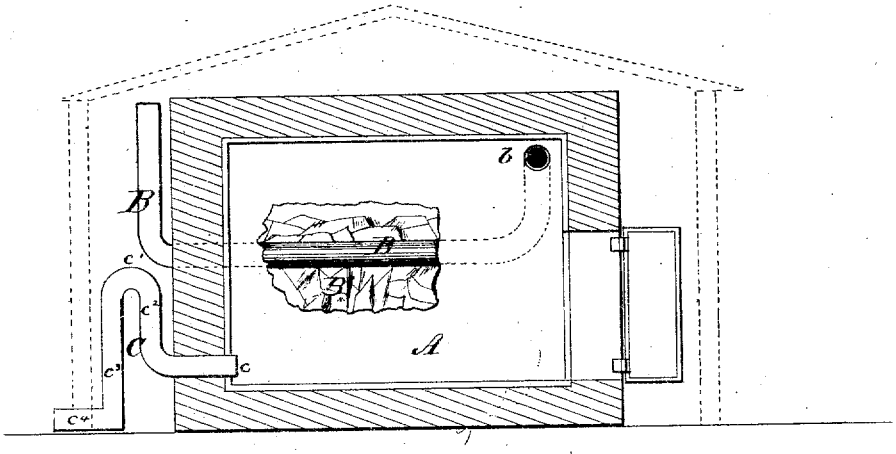

In Figure 1 of the drawing is illustrated a building to which my improvements are applied, A being the preserving chamber or chambers therein. B represents the air-induction pipe or pipes, made in any suitable form—straight, coiled, or otherwise—and surrounded by ice or other refrigerant or cooling material. The pipe (or pipes) B enters the chamber A at *b*, at or near the top or ceiling of said chamber, into which its cooled contents are discharged.

C represents the air-eduction pipe or pipes, communicating with the chamber A at or near the floor of the latter, as shown at *c*. The eduction-pipe illustrated is in the form of a siphon, of which $c^1$ is the apex, and $c^2$ and $c^3$ the short and long legs, respectively, the latter terminating in a bend, $c^4$.

The operation is as follows: The air permitted to enter the induction-pipe B is taken from without the preserving-chamber A, but within the house in which said chamber is contained, so as to avoid the heated atmosphere exterior to the building. The air thus taken in its passage through the pipe B is cooled by ice or other refrigerant or cooling material surrounding said pipe, as shown at B′, and makes its way into the chamber A, where, by reason of its gravity, it falls, expelling the warmer and lighter air through the eduction passage or pipe C. The chamber A thus becomes filled with cold air, which also rises in the siphon to the apex of the latter. The siphon (on a familiar philosophical principle) at once discharges its contents into the lighter, because warmer, atmosphere outside, thereby producing a vacuum in the chamber A, which is filled by cold air from the pipe B.

The operation described continues as long as the air in the siphon is colder than the outside atmosphere, and a constant circulation or current is thus kept up within the chamber A. The operation of the siphon is aided by the weight of the cold heavy air within the chamber, which, being admitted at the top of the latter, in its fall expels the lighter air through the eduction-pipe. The rapidity of circulation in the chamber A depends upon the length of the outer leg of the siphon or the capacity of its discharge-orifice and the temperature of the outer air. Hence said circulation may be controlled by elongating or contracting the long leg of the siphon, or by contracting or expanding the diameter of its nozzle or discharge-orifice.

I have described the foregoing improvements as applied to a preserving-house, but they are equally applicable to refrigerators and ice-chests. When applied to a house, said house and the preserving-chamber, either or both, may be packed with ice, or the refrigerant or cooling material may be placed around the induction pipe or pipes B only.

Figure 2:
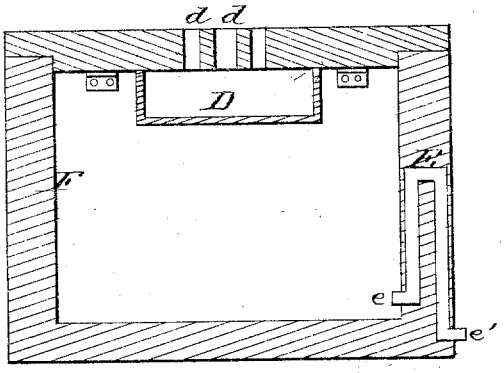

A modification particularly applicable to ice-chests and refrigerators is shown at Fig. 2. F is the chest or refrigerator, and D a pan or other receptacle for ice. *d d* are openings permitting the outer atmosphere to pass into the pan D. Becoming cooled by the ice in said pan, the air falls from the latter down into the chest F, and, expelling the lighter air in said chest through the eduction-passage or siphon E, rises in the latter, and discharges into the outer atmosphere, in the manner already described. The eduction passage or siphon, in this case, is arranged in the wall of the refrigerator or chest, communicating, by suitable openings *e* and *e'*, with the preserving-compartment and outside atmosphere, respectively.

What I claim as my invention is—

In combination with a preserving-chamber or refrigerator having an induction pipe or opening for admitting air at or near its top or ceiling, a siphon eduction pipe or passage communicating with the interior of said chamber, at or near its bottom or floor, for the escape of air, substantially as set forth.

In testimony that I claim the foregoing I have hereunto set my hand this 19th day of July, 1877.

HARVEY W. McKNIGHT.

Witnesses:

M. PANL. CONNOLLY,
CHAS. F. VAN HORN.